June 9, 1925. 1,541,027
R. B. BROWN
TIRE
Filed May 9, 1924   2 Sheets-Sheet 1

Inventor
Robert B. Brown

By Herbert E. Smith
Attorney

June 9, 1925. 1,541,027
R. B. BROWN
TIRE
Filed May 9, 1924  2 Sheets-Sheet 2

Inventor
Robert B. Brown.

By Herbert E. Smith
Attorney

Patented June 9, 1925.

1,541,027

UNITED STATES PATENT OFFICE.

ROBERT BRUCE BROWN, OF SPOKANE, WASHINGTON.

TIRE.

Application filed May 9, 1924. Serial No. 712,028.

*To all whom it may concern:*

Be it known that I, ROBERT BRUCE BROWN, a citizen of the United States, residing at Spokane, in Spokane County, and State of Washington, have invented certain new and useful Improvements in Tires, of which the following is a specification.

My present invention relates to improvements in resilient tires of the solid cushion type and designed for use on wheels for automotive vehicles including passenger cars and trucks. The tire conforms to the construction and is adapted for use on existing standard wheels now in use and can be used as a substitute for pneumatic tires on such wheels.

The invention involves the utilization of an inner and an outer rim and an elastic and compressible core or cushion in conjunction with the usual solid rubber cushion tire, for absorbing shocks and vibrations to which the wheel is subjected during travel of the vehicle, and consists in certain novel combinations and arrangements of parts as will hereinafter be more fully pointed out and claimed.

In the accompanying drawings I have illustrated one complete example of the physical embodiment of my invention wherein the parts are combined and arranged in accordance with the best mode I have thus far devised for the practical application of the principles of my invention.

Figure 1:
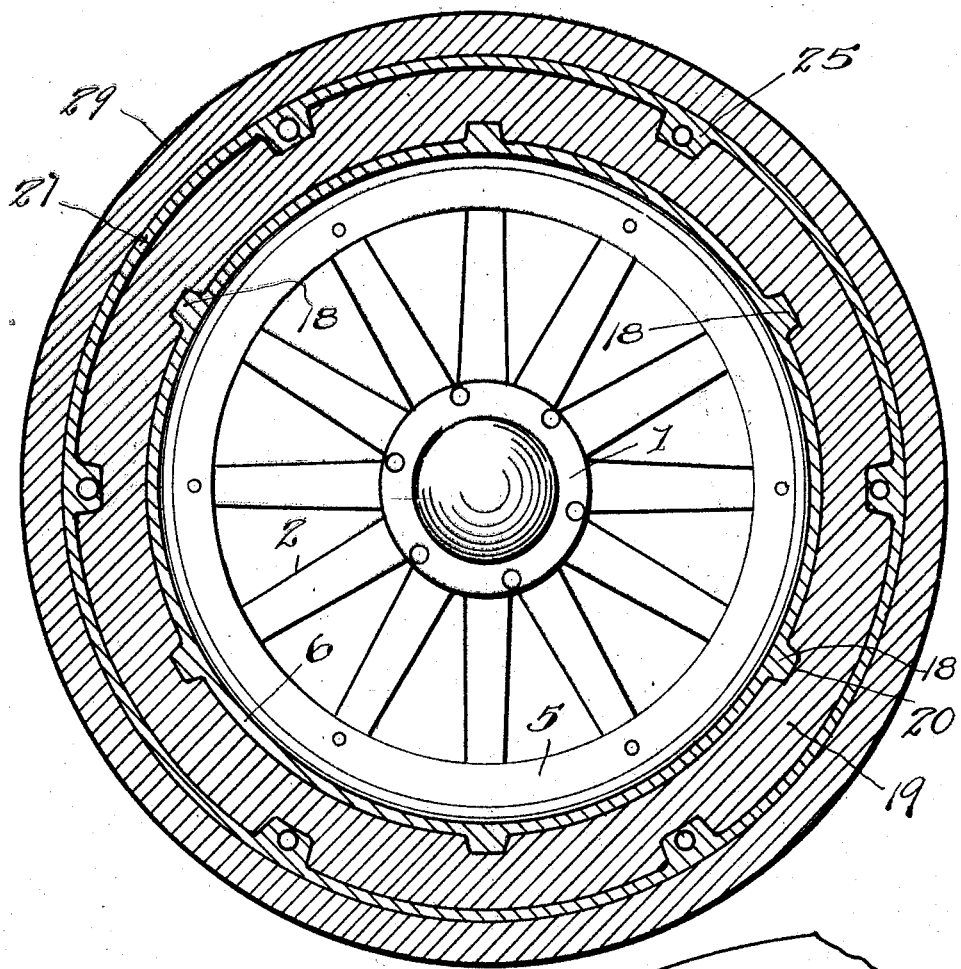
Figure 1 is a longitudinal vertical sectional view of a tire embodying my invention, and showing the remainder of a wheel in side elevation.
Figure 2:
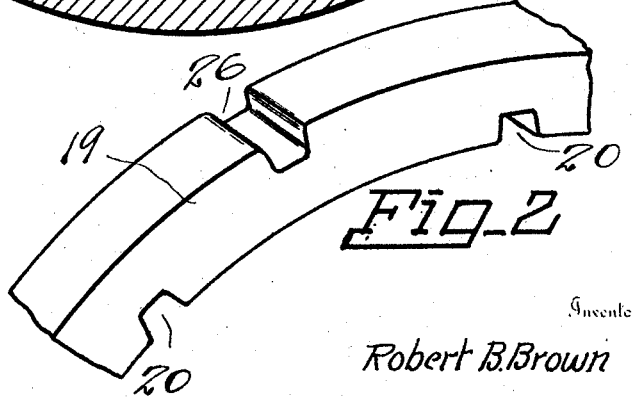
Figure 2 is a perspective view of a portion of the resilient core or cushion, detached from the tire.

In the preferred form of the invention as illustrated in the drawings I have designated the standard parts of a wheel in Figure 1 as the hub 1 and spokes 2, with the wood felloe 3 and the metallic felloe ring 4, the latter having a side flange 5 engaging the side face of the felloe.

The inner metallic rim is carried on the felloe ring and is of channel shape with a base ring 6 having an annular beveled inner face 7 for co-action with the complementary exterior beveled face 8 of the felloe ring 4. A second exterior beveled face 9 is provided on the felloe ring which is complementary to a beveled face 9′ on the inner side of the inner rim. These latter faces are spaced apart to receive the fastening lugs 10 of usual type which are secured by means of the bolts 11 passing through the lugs, the flange 5 of the felloe ring, and into the felloe 3. At the side of the wheel opposite the lugs 10, or the inside of the wheel, retaining lugs 12 are secured to the felloe by bolts or rivets 13, and these latter lugs engage the side or inner edge of the felloe ring 4. The inner rim is thus held in position on the felloe ring by the lugs 10 and 12, the latter being fixed and the former detachable for displacement when removing the tire from the wheel.

The inner rim is held against circumferential movement on the felloe ring by means of an integral pin 14 which is radially disposed and projects from the inner periphery of the rim through the opening 15 of the felloe which is usually occupied by the air valve of pneumatic tires when such are used.

The channel shaped inner rim has a pair of side flanges 16 and 17, spaced a suitable distance apart, and within the channel, on the exterior periphery of the rim base 6, are fashioned a series of equidistant, transversely disposed lugs 18, preferably integral with the rim base 6 and extending from one flange or side wall of the rim to the other flange or side wall.

These exterior lugs on the face of the rim base are for retaining the inner core or cushion 19 in place, and the latter is fashioned with complementary notches 20 on its inner periphery to fit over the series of lugs 18 on the rim base. The core or inner cushion 19 is resilient and compressible and may be made of a porous and elastic rubber or composition involving the use of rubber. The resilient core is preferably held within its channel of the inner rim under pressure, as for instance light cars or passenger vehicles would be equipped with wheels in which the cushion would be under less pressure than that required for use with wheels of heavier cars or trucks. The cushion may be cast and vulcanized, or preferably it may be placed under the desired pressure for compressing its material to the proper consistency for the particular use required.

Figures 3, 4:
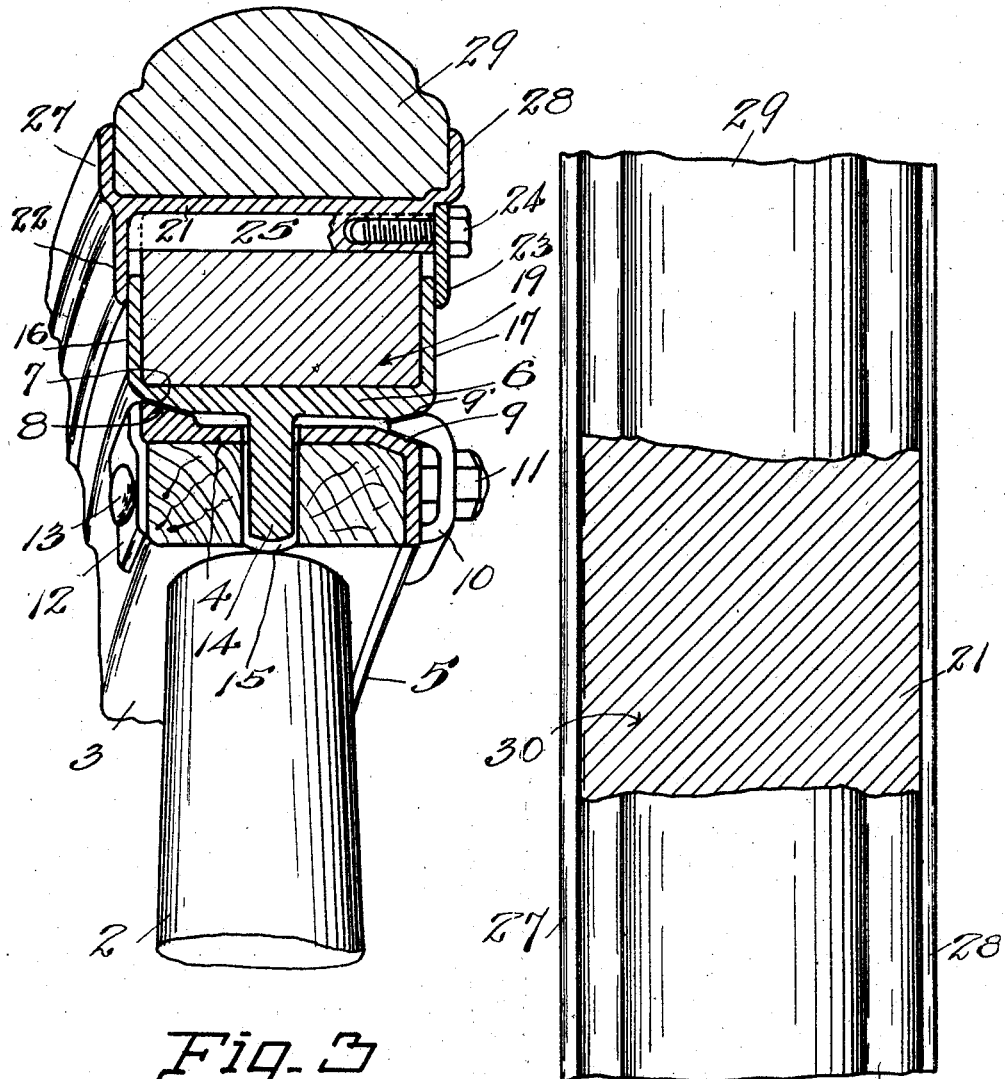
Figure 3 is a transverse sectional view, partly in perspective, of the tire structure.
Figure 4 is an edge view of a portion of the tire, with a part removed therefrom to disclose the face of the outer corrugated rim.

The cushion as seen in Figure 3 projects beyond the outer edges of the side flanges 16 and 17 of the annular rim 6, and supports the base 21 of the outer rim of the tire. The outer rim has an inner annular flange 22 which overlaps the outer edge of the side flange 16 of the inner rim, and at its opposite side the retaining ring 23 overlaps the outer edge of the side flange 17 of the inner rim. The flange 22 and the ring 23 thus hold the inner rim and the outer rim in alinement against lateral displacement and provide guides for movement of the outer rim when the load carried thereby compresses the cushion 19. As the resilient cushion is compressed within the inner rim it absorbs the relative movement between the outer rim and the inner rim and prevents shocks and vibrations being transmitted through the wheel to the vehicle in well known manner.

The retaining ring 23 is secured in place by means of bolts 24 passing through the ring and threaded into sockets in lugs 25 of the outer rim. These lugs are similar to the lugs 18 of the inner rim but are located on the inner periphery of the outer rim and extend transversely thereof. The lugs 25 occupy complementary notches 26 in the outer periphery of the annular cushion or core and hold the core and outer rim against relative circumferential movement. The presence of these lugs 18 and 25, in their staggered relation as indicated in Figure 1, aids in a uniform distribution of the shock or vibration received by the cushion and stabilizes the movement between the inner and outer rims that is being absorbed.

The outer rim has the usual side walls 27 and 28 between which the tire 29 is carried, said tire being of the usual hard rubber or its composition, and is vulcanized to the outer periphery of the outer rim base 21. To assist in holding the tire against circumferential movement the outer periphery of the rim 21 may be scored or corrugated as indicated at 30 in Figure 4.

From the above description taken in connection with my drawings it will be apparent that I have provided a structure of the required strength and durability and which will to a practical degree absorb the shocks and vibrations of the road before they can be transferred to the wheel and vehicle.

Having thus fully described my invention, what I claim as new and desire to secure by Letters Patent is

The combination with an outer rim having an inner retaining flange and a complementary removable retaining ring, of an inner rim having side flanges for co-action with the retaining flange and retaining ring, spaced transverse lugs on the inner periphery of the outer rim and means for securing said retaining ring to said lugs, a series of spaced transverse lugs on the exterior periphery of the inner rim, an annular cushion having staggered notches in its interior and exterior peripheries for co-action with said two series of lugs, a felloe and felloe ring, and means for securing the inner rim on said felloe ring.

In testimony whereof I affix my signature.

ROBERT BRUCE BROWN.